United States Patent
Hirano

[11] Patent Number: 5,161,638
[45] Date of Patent: Nov. 10, 1992

[54] FINAL DRIVE SUPPORTING STRUCTURE FOR VEHICLE

[75] Inventor: Yoshinori Hirano, Yokohama, Japan

[73] Assignee: Nissan Motor Co., Ltd., Yokohama, Japan

[21] Appl. No.: 869,083

[22] Filed: Apr. 15, 1992

Related U.S. Application Data

[63] Continuation of Ser. No. 658,913, Feb. 2, 1991, abandoned.

[30] Foreign Application Priority Data

Feb. 23, 1990 [JP] Japan ................. 2-43726

[51] Int. Cl.⁵ ............................................ B60K 17/00
[52] U.S. Cl. ............................... 180/360; 180/312; 180/378
[58] Field of Search .............. 180/312, 360, 378; 280/716

[56] References Cited

U.S. PATENT DOCUMENTS 3,727,713  4/1973  Van Winsen et al. ............. 180/360
4,699,230  10/1987  Solleder et al. ................... 180/360
4,856,751  8/1989  Ohba ................................. 180/378
4,867,260  9/1989  Cameron et al. .................. 180/360

FOREIGN PATENT DOCUMENTS

3803236A1  7/1989  Fed. Rep. of Germany.
4029575A1  4/1991  Fed. Rep. of Germany.

Primary Examiner—Kenneth R. Rice
Attorney, Agent, or Firm—Lowe, Price, Leblanc & Becker

[57] ABSTRACT

To reduce vibrations and noise, a final drive assembly of a vehicle is supported at four separate support points. The first and fourth support points are on the front side of the axis of a ring gear of a final reduction gear pair, and a second and third support points are on the opposite rear side. The third and fourth support points are on the same side of the axis of a drive pinion of the final reduction gear pair, as the ring gear. The first and second support points are on the opposite side of the axis to the ring gear. The support stiffness is greatest at one of the first and third support points. The support positions and support stiffness are preferably determined according to theoretically obtained mathematical relationships.

13 Claims, 4 Drawing Sheets

FINAL DRIVE SUPPORTING STRUCTURE FOR VEHICLE

This application is a continuation of application Ser. No. 658,913 filed Feb. 22, 1991, now abandoned.

BACKGROUND OF THE INVENTION

The present invention relates to a final drive supporting structure for supporting a final drive assembly to a vehicle body, and more specifically to a final drive supporting structure designed to minimize tilting movement of a drive pinion shaft of the final drive assembly to reduce vibrations and noise.

A final drive assembly is suspended resiliently and flexibly from a vehicle body in order to isolate vibrations and noise due to a reaction torque about a drive pinion axis and a reaction torque about a drive axle. A U.S. Pat. No. 4,699,230 (corresponding to Japanese Patent Provisional Publication No. 61-125924) discloses a final drive suspension structure having at least two elastic suspension elements for supporting a final drive assembly on a vehicle body. The support positions and stiffnesses (or rigidities) of the elastic suspension elements are so determined that one of the suspension positions is away from a torque support plane of a torque (a resulting torque of a starting torque and a propeller shaft torque) determined by the other suspension element, and that swivel movements of the same magnitude are produced in opposite directions at a connecting point between the propeller shaft and the drive pinion shaft. Therefore, this suspension structure can prevent displacement of the connection point which is subject to influences of the starting torque and propeller shaft torque, and improve the durability of the joint between the drive pinion shaft and propeller shaft.

However, this conventional suspension structure is unable to sufficiently prevent angular displacement (inclination) of the axis of the drive pinion shaft. Especially, the inclination of the axis of the drive pinion shaft increases the vibrations and noise produced by a secondary couple due to a joint angle of a universal joint of the propeller shaft.

SUMMARY OF THE INVENTION

It is an object of the present invention to provide a final drive supporting structure which can minimize an undesired displacement of the axis of the drive pinion shaft.

According to the present invention, a final drive supporting structure for a vehicle, comprises a final drive assembly; and first, second, third and fourth elastic supporting means for elastically supporting the final drive assembly to a vehicle body of the vehicle, respectively, at first, second, third and fourth support points. The final drive assembly comprises a final reduction gear set including at least a drive pinion rotatable about a predetermined input axis, and a ring gear which is in engagement with the drive pinion and which is ratable about a predetermined output axis lying in an imaginary lateral plane substantially perpendicular to the input axis. The ring gear is disposed on a first lateral side of an imaginary longitudinal plane which contains the input axis and which is substantially perpendicular to the output axis. The first and fourth supporting means are located on a front side of the lateral plane, and the second and third supporting means are located on a rear side of the lateral plane which is opposite to the front side. The first and second supporting means are located on a second lateral side of the longitudinal plane which is opposite to the first lateral side, and the third and fourth supporting means are located on the first lateral side of the longitudinal plane. The first, second, third and fourth supporting means have respective support stiffnesses each of which is equal to or smaller than a predetermined maximum value. The stiffness of at least one of the first, second, third and fourth supporting means is smaller than the maximum value. The stiffness of one of the first and third supporting means is equal to the maximum value.

A vehicle according to the present invention, comprises a vehicle body, at least one drive wheel, a propeller shaft (or drive shaft), a final drive assembly, and first, second, third and fourth supporting means for elastically suspending the final drive assembly on the vehicle, respectively, at first, second, third and fourth support points. The final drive assembly comprises an input rotary member, such as a drive pinion shaft, connected with the propeller shaft, an output rotary member, such as a side gear shaft, connected with an axle of the drive wheel, and a final reduction gear set through which rotation is transmitted from the input member to the output member. An axis of the input member extends substantially in parallel to a longitudinal axis of the vehicle, and an axis of the axle of the drive wheel extends substantially in parallel to a lateral axis of the vehicle. The final reduction gear set comprises larger and smaller gears engaging with each other. The first and fourth support points are located forward of the axis of the axle of the drive wheel, and the second and third support points are located rearward of the axis of the axle. The fourth and third support points are located on a first lateral side of the axis of the input member on which the larger gear of the final reduction gear set is disposed, and the first and second support points are located on a second lateral side of the axis of the input member. The first, second, third and fourth supporting means have respective support stiffnesses each of which is equal to or smaller than a predetermined maximum value. The support stiffness of at least one of the first, second, third and fourth supporting means is smaller than the maximum value. The stiffness of at least one of the first supporting means of the first support point and the third supporting means of the third support point is equal to the maximum value.

DETAILED DESCRIPTION OF THE INVENTION

Figure 5:
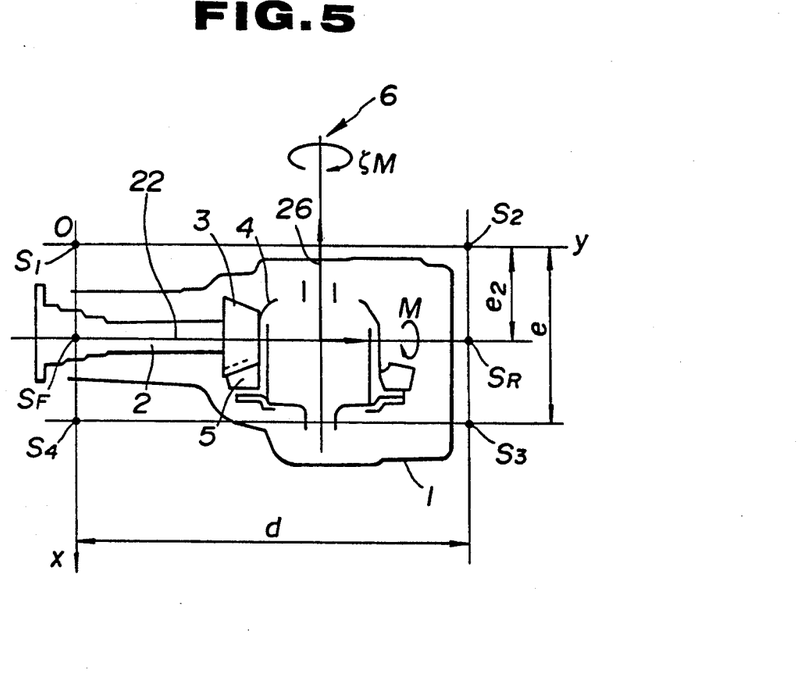
FIG. 5 is a schematic plan view of a final drive support structure for illustrating a theoretical background of the present invention.

In the present invention, a final drive assembly 1 for a vehicle is supported at four support points (positions) $S_1$, $S_2$, $S_3$ and $S_4$, as shown in FIG. 5. The final drive assembly 1 has an input drive shaft 2, a drive pinion 3, a ring gear 5, and a differential 4 which is connected with a drive wheel axle 6. When the final drive assembly 1 is correctly mounted on a vehicle, the input drive shaft 2 extends along a longitudinal axis (x axis) of the vehicle. A front end of the input drive shaft 2 (which is the left-hand end as viewed in FIG. 5) is connected with a propeller shaft (or drive shaft) of the vehicle. The drive pinion 3 is formed in a rear end of the input drive shaft 2. The drive pinion 3 is in engagement with the ring gear 5. The drive pinion 3 and the ring gear 5 constitute a final speed reducing gear pair. The drive pinion 3 is the smaller gear of the gear pair, and the ring gear 5 is the larger gear. The final reduction gear pair of the pinion of 3 and the ring gear 5 reduces the speed of rotation transmitted therethrough, changes the direction of path of drive torque, and transmits drive torque from the input drive shaft 2 to the differential 4. The drive wheel axle 6 extends along a lateral axis (y axis) of the vehicle. Generally, the drive wheel axle 6 consists of left and right axle shafts drivingly connected with left and right drive wheels of the vehicle. The differential 4 is connected between the left and right axle shafts.

The input drive shaft 2 is an input member of the final drive assembly 1, and the axis of the input drive shaft 2 is an input axis 22 of the final drive assembly 1. The axis of the drive wheel axle 6 is an output 26 of the final drive assembly 1. The ring gear 5 is coaxial with the drive wheel axle 6, and rotatable about the output axis 26. The input axis 22 lies in an imaginary longitudinal vertical plane, and the output axis 26 lies in an imaginary lateral vertical plane which is substantially perpendicular to the imaginary longitudinal vertical plane. In FIG. 5, the input axis 22 and the longitudinal plane are both shown by the same straight line passing through points $S_F$ and $S_R$. The output axis and the lateral plane are both shown by the same straight line 26. The longitudinally extending input axis 22 is substantially perpendicular to the lateral vertical plane. The laterally extending output axis 26 is substantially perpendicular to the longitudinal plane.

The final drive assembly 1 is suspended at the four support points $S_1$, $S_2$, $S_3$ and $S_4$, on a vehicle body (not shown in FIG. 5), by first, second, third and fourth elastic supporting means, respectively. The first support point $S_1$ of the first supporting means, and the fourth support point $S_4$ of the fourth supporting means are located in front of the laterally extending output axis 26 of the drive wheel axle 6. The second support point $S_2$ of the second supporting means and the third support point $S_3$ of the third supporting means are in the rear of the output axis 26. Each of the first and fourth support points $S_1$ and $S_4$ is closer to the front of the vehicle as measured along the longitudinal axis of the vehicle, than the output axis 26 is. Each of the second and third support points $S_2$ and $S_3$ is closer to the rear of the vehicle than the output axis 26 is.

The ring gear 5 is disposed on a first lateral side of the longitudinally extending input axis 22. In the example shown in FIG. 5, the first lateral side is the left side which is closer to the left end of the vehicle. The first and second support points $S_1$ and $S_2$ are located on a second lateral side (right side) of the input axis 22. On the other hand, the fourth and third support points $S_4$ and $S_3$ are located on the first lateral side of the input axis 22. The first lateral side is the side on which the ring gear 5 is disposed. Therefore, the third and fourth support points $S_3$ and $S_4$, and the ring gear 5 are situated on the same side of the input axis 22, and the first and second support points $S_1$ and $S_2$ are on the opposite side.

Each of the support points is spaced from the longitudinal plane and the lateral plane. In the example shown in FIG. 5, each of a first longitudinal straight line connecting the first and second support points $S_1$ and $S_2$ and a second longitudinal straight line connecting the fourth and third support points $S_4$ and $S_3$ is substantially parallel to the longitudinally extending input axis 22. Each of a first lateral straight line connecting the first and fourth support points $S_1$ and $S_4$ and a second lateral straight line connecting the second and third support points $S_2$ and $S_3$ is substantially parallel to the laterally extending output axis 26. The support points $S_1$, $S_2$, $S_3$ and $S_4$ form a rectangle.

Figure 6:
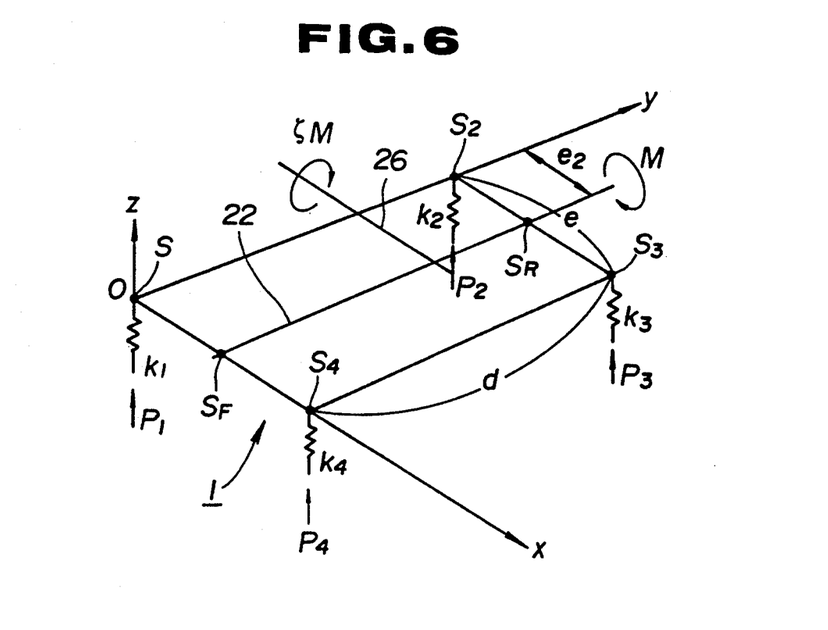
FIG. 6 is a schematic view for illustrating the arrangement of elastic support members shown in FIG. 5.

In the example shown in FIG. 5, we employ an axis system whose origin O lies at the first support point $S_1$. The second support point $S_2$ lies on the y axis, and the fourth support point $S_4$ lies on the x axis. The first, second, third and fourth support points $S_1$, $S_2$, $S_3$ and $S_4$ are all situated in the x-y plane. FIG. 6 schematically shows the supporting structure of FIG. 5. In FIG. 6, $k_1$, $k_2$, $k_3$ and $k_4$ are support stiffnesses (or rigidities) of the first, second, third and fourth support points $S_1$, $S_2$, $S_3$ and $S_4$, respectively. In FIG. 6, e is a total lateral distance which is a distance between the first and fourth support points $S_1$ and $S_4$ (or a distance between $S_2$ and $S_3$), $e_2$ is a partial lateral distance which is a distance between the first support points $S_1$ (or the second support point $S_2$) and the input axis 22 of the input drive shaft 2, and d is a total longitudinal distance between the first and second support points $S_1$ and $S_2$ (or a distance between $S_3$ and $S_4$). In FIG. 6, M is a drive shaft torque about the input axis 22 of the input drive shaft 2, $\zeta$ (zeta) is a final gear reduction ratio of the final drive assembly 1, $\zeta M$ is a starting torque about the output axis 26 of the drive wheel axle 6, and $P_1$, $P_2$, $P_3$ and $P_4$ are support reaction forces acting, respectively, at the first, second, third and fourth support points $S_1$, $S_2$, $S_3$ and $S_4$.

Figure 7:
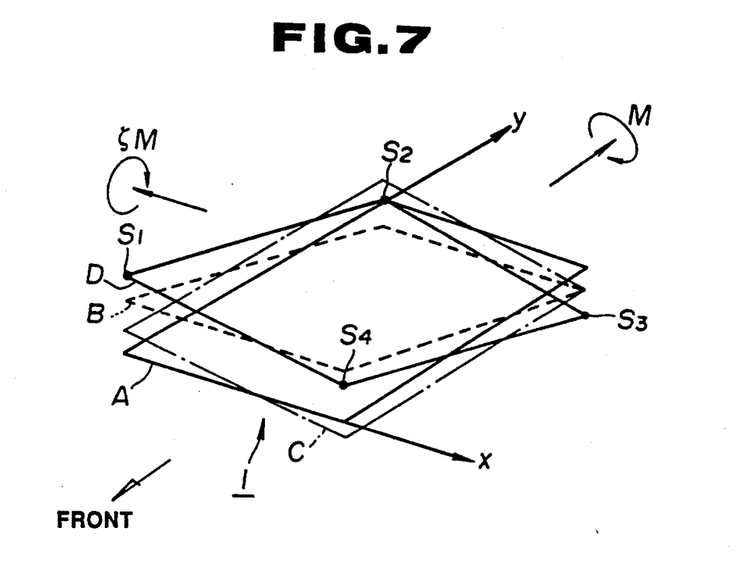
FIG. 7 is a schematic view for illustrating behavior of the final drive assembly supported by the elastic supporting members whose stiffnesses are not properly determined.
Figure 8:
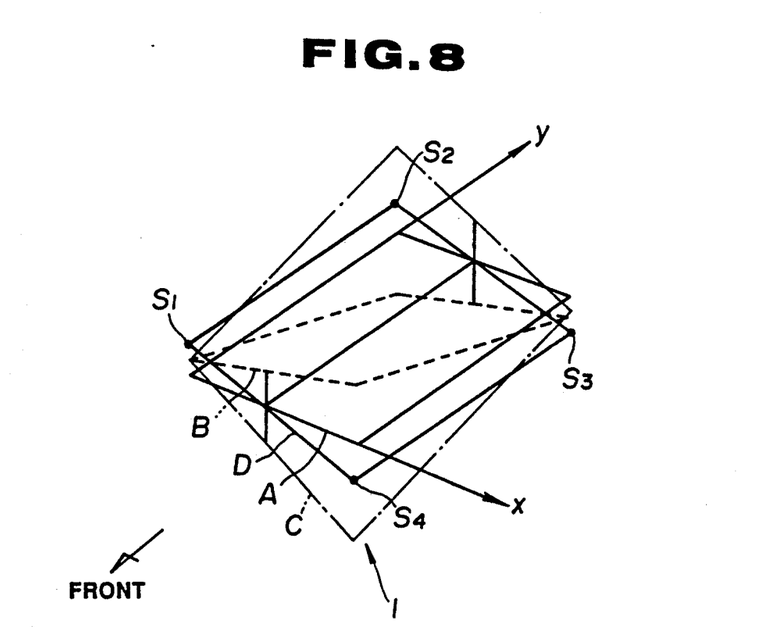
FIG. 8 is a schematic view for illustrating behavior of the final drive assembly supported by the elastic support members whose stiffnesses are determined according to the present invention.

When the support stiffnesses $k_1$–$k_4$ are set equal to one another, the final drive assembly 1 is displaced as shown in FIG. 7. If only the starting torque $\zeta M$ acts on the final drive assembly 1, then the assembly 1 pitches so that its pitch attitude is changed from a standard state A to a state B shown in FIG. 7. If only the drive shaft torque M acts on the assembly 1, then the assembly 1 rolls from the standard state A to a state C. In actual situations, the final drive assembly 1 undergoes both the drive shaft torque M and the starting torque $\zeta M$, and moves from the standard state A to a state D as the result of a pitching displacement and a rolling displacement. In this case, the input axis 22 of the input drive shaft 2 is inclined with reference to the standard state A because all the support stiffnesses $k_1$–$k_4$ are equal. However, it is possible to prevent inclination of the input drive shaft 2 by determining the support positions and the support stiffnesses $k_1$-$k_4$ properly. In the example shown in FIG. 8, the input axis 22 of the input drive shaft 2 is not inclined. In FIG. 8, both a pitching displacement (corresponding to the state B, and a rolling displacement (corresponding to the state C) are involved. However, the resultant displacement (corresponding to the state D) of the pitching and rolling displacements is a pure rolling displacement, so that the axis of the input drive shaft 2 is held in the correct position.

In the example of FIG. 8, the diagonally arranged first and third support points $S_1$ and $S_3$ are made harder to move by making the first and third support stiffnesses $k_1$ and $k_3$ higher, to attain a desired displacement mode according to the following theoretical background.

A relationship of forces around the y axis shown in FIGS. 5 and 6 is expressed by the following equation (1a).

$$eP_3 + eP_4 - M = 0 \tag{1a}$$

A relationship of forces around the x axis is expressed by the following equation (1b).

$$dP_2 + dP_3 - \zeta M = 0 \tag{1b}$$

In these equations, the weight of the final drive assembly 1 is neglected because, when the vehicle is accelerated rapidly in the first or second gear, the drive shaft torque M and the starting torque $\zeta M$ have far greater influences than the weight of the final drive assembly 1.

The support reactions $P_1$-$P_4$ acting at the four support points $S_1$-$S_4$ have a relationship expressed by the following equations (1c).

$$P_1 + P_2 + P_3 + P_4 = 0 \tag{1c}$$

Since the present problem is an indeterminate problem, we treat the fourth support reaction $P_4$ as an indeterminate reaction, and obtain the following equations (2a), (2b) and (2c) from the equations (1a), (1b) and (1c).

$$P_1 = -P_4 - \frac{\zeta}{d} M \tag{2a}$$

$$P_2 = P_4 - \left(\frac{1}{e} - \frac{\zeta}{d}\right)M \tag{2b}$$

$$P_3 = -P_4 + \frac{M}{e} \tag{2c}$$

To determine the fourth reaction $P_4$, we consider the following equation (3).

$$U = \frac{1}{2} \frac{P_1^2}{k_1} + \frac{1}{2} \frac{P_2^2}{k_2} + \frac{1}{2} \frac{P_3^2}{k_e} \tag{3}$$

$$= \frac{1}{2 k_1} \left(-P_4 - \frac{\zeta}{d} M\right)^2 +$$

$$\frac{1}{2 k_2} \left(P_4 - \left(\frac{1}{e} - \frac{\zeta}{d}\right)M\right)^2 +$$

$$\frac{1}{2 k_3} \left(-P_4 + \frac{M}{d}\right)^2$$

Partial differentiation of the equation (3) with respect to $P_4$ yields the following equation (4).

$$\frac{\partial U}{\partial P_4} = \frac{-1}{k_1}\left(-P_4 - \frac{\zeta}{d} M\right) + \tag{4}$$

$$\frac{1}{k_2}\left\{P_4 - \left(\frac{1}{e} - \frac{\zeta}{d}\right)M\right\} +$$

$$\frac{-1}{k_3}\left(-P_4 + \frac{M}{d}\right) = \frac{P_4}{k_4}$$

Therefore, the reaction $P_4$ at the fourth support point $S_4$ is given by the following equation (5).

$$P_4 = \frac{\left\{\frac{-\zeta}{k_1 d} \frac{1}{k_2}\left(\frac{1}{e} - \frac{\zeta}{d}\right) + \frac{1}{k_3 e}\right\}M}{\frac{1}{k_1} + \frac{1}{k_2} + \frac{1}{k_3} - \frac{1}{k_4}} \tag{5}$$

Then, the following equations (6a), (6b) and (6c) are obtained from the equations (2a), (2b), (2c) and (5).

$$P_1 = \frac{-\left\{\frac{1}{k_2} \cdot \frac{1}{e} + \frac{1}{k_3}\left(\frac{1}{e} + \frac{\zeta}{d}\right) - \frac{1}{k_4} \cdot \frac{\zeta}{d}\right\}M}{\frac{1}{k_1} + \frac{1}{k_2} + \frac{1}{k_3} - \frac{1}{k_4}} \tag{6a}$$

$$P_2 = \frac{-\left\{\frac{1}{k_1} \cdot \frac{1}{e} - \frac{1}{k_3} \cdot \frac{\zeta}{d} - \frac{1}{k_4}\left(\frac{1}{e} - \frac{\zeta}{d}\right)\right\}M}{\frac{1}{k_1} + \frac{1}{k_2} + \frac{1}{k_3} - \frac{1}{k_4}} \tag{6b}$$

$$P_3 = \frac{\left\{\frac{1}{k_1}\left(\frac{1}{e} + \frac{\zeta}{d}\right) + \frac{1}{k_2} \cdot \frac{\zeta}{d} - \frac{1}{k_4} \cdot \frac{1}{e}\right\}M}{\frac{1}{k_1} + \frac{1}{k_2} + \frac{1}{k_3} - \frac{1}{k_4}} \tag{6c}$$

The first support point $S_1$ (0,0,$z_1$), the second support point $S_2$ (0,d,$z_2$) and the third support point $S_3$ (e,d,$z_3$) determine a plane which is represented by the following equation (7)

$$z = \frac{z_3 - z_2}{e} x + \frac{z_2 - z_1}{d} y + z_1 \tag{7}$$

In this equation, $z_1$, $z_2$ and $z_3$ are the z coordinates of the points $S_1$, $S_2$ and $S_3$, and expressed, respectively, by the following equations (8a), (8b) and (8c).

$$z_1 = \frac{P_1}{k_1} \tag{8a}$$

$$z_2 = \frac{P_2}{k_2} \tag{8b}$$

-continued $$z_3 = \frac{P_3}{k_3} \quad (8c)$$

The input axis 22 of the drive shaft 2 is held horizontal if the point $S_F$ ($e_2$,0,0) and the point $S_R$ ($e_2$,d,0) always satisfy the equation (7) irrespective of the displacements of the support points $S_1$, $S_2$ and $S_3$. Therefore, the following equations (9a) and (9b) are obtained by considering the points $S_F$ and $S_R$ to be points in the plane determined by the equation (7).

$$\frac{e_2}{e} \cdot \frac{P_3}{k_3} - \frac{e_2}{e} \cdot \frac{P_2}{k_2} + \frac{P_1}{k_1} = 0 \quad (9a)$$

$$\frac{e_2}{e} \cdot \frac{P_3}{k_3} - \frac{e_2}{e} \cdot \frac{P_2}{k_2} + \frac{P_2}{k_2} = 0 \quad (9b)$$

Expansion of the equation (9a) by substituting the equations (6a), (6b) and (6c) thereinto, gives the following equation (10a)

$$\frac{\frac{e_2}{e}\left\{\frac{1}{k_1}\left(\frac{1}{e}+\frac{\zeta}{d}\right)+\frac{1}{k_2}\cdot\frac{\zeta}{d}-\frac{1}{k_4}\cdot\frac{1}{e}\right\}M}{k_3\left(\frac{1}{k_1}+\frac{1}{k_2}+\frac{1}{k_3}-\frac{1}{k_4}\right)}+ \quad (10a)$$

$$\frac{\frac{e_2}{e}\left\{\frac{1}{k_1}\cdot\frac{1}{e}-\frac{1}{k_3}\cdot\frac{\zeta}{d}-\frac{1}{k_4}\left(\frac{1}{e}-\frac{\zeta}{d}\right)\right\}M}{k_2\left(\frac{1}{k_1}+\frac{1}{k_2}+\frac{1}{k_3}-\frac{1}{k_4}\right)}-$$

$$\frac{\left\{\frac{1}{k_2}\cdot\frac{1}{e}+\frac{1}{k_3}\left(\frac{1}{e}+\frac{\zeta}{d}\right)-\frac{1}{k_4}\cdot\frac{\zeta}{d}\right\}M}{k_1\left(\frac{1}{k_1}+\frac{1}{k_2}+\frac{1}{k_3}-\frac{1}{k_4}\right)}=0$$

$$\therefore \frac{1}{k_3}\cdot\frac{e_2}{e}\left\{\frac{1}{k_1}\left(\frac{1}{e}+\frac{\zeta}{d}\right)+\frac{1}{k_2}\cdot\frac{\zeta}{d}-\frac{1}{k_4}\cdot\frac{1}{e}\right\}+$$

$$\frac{1}{k_2}\cdot\frac{e_2}{e}\left\{\frac{1}{k_1}\cdot\frac{1}{e}-\frac{1}{k_3}\cdot\frac{\zeta}{d}-\frac{1}{k_4}\left(\frac{1}{e}-\frac{\zeta}{d}\right)\right\}-$$

$$\frac{1}{k_1}\left\{\frac{1}{k_2}\cdot\frac{1}{e}+\frac{1}{k_3}\left(\frac{1}{e}+\frac{\zeta}{d}\right)-\frac{1}{k_4}\cdot\frac{\zeta}{d}\right\}=0$$

$$\therefore \frac{1}{k_1 k_3}\left(\frac{1}{e}+\frac{\zeta}{d}\right)\left(\frac{e_2}{e}-1\right)+\frac{1}{k_1 k_2}\cdot\frac{1}{e}\left(\frac{e_2}{e}-1\right)-$$

$$\frac{1}{k_3 k_4}\cdot\frac{e_2}{e^2}-\frac{1}{k_2 k_4}\cdot\frac{e_2}{e}\left(\frac{1}{e}-\frac{\zeta}{d}\right)+\frac{1}{k_1 k_4}\cdot\frac{\zeta}{d}=0$$

Similar expansion of the equation (9b) by substituting the equations (6a), (6b) and (6c) into the equation (9b), gives the following equation (10b)

$$\frac{1}{k_1 k_3}\cdot\frac{e_2}{e}\left(\frac{1}{e}+\frac{\zeta}{d}\right)+\frac{1}{k_1 k_2}\cdot\frac{1}{e}\left(\frac{e_2}{e}-1\right)- \quad (10b)$$

-continued $$\frac{1}{k_3 k_4}\cdot\frac{e_2}{e^2}-\frac{1}{k_2 k_4}\left(\frac{1}{e}-\frac{\zeta}{d}\right)\left(\frac{e_2}{e}-1\right)+\frac{1}{k_2 k_3}\cdot\frac{\zeta}{d}=0$$

The following equation (11a) is obtained by multiplying both members of the equation (10a) by $k_1 k_4$.

$$\frac{e_2}{e}\left(\frac{1}{e}-\frac{\zeta}{d}\right)\frac{k_1}{k_2}+\frac{e_2}{e^2}\cdot\frac{k_1}{k_3}+\frac{1}{e}\left(1-\frac{e_2}{e}\right)\frac{k_4}{k_2}+ \quad (11a)$$

$$\left(\frac{1}{e}+\frac{\zeta}{d}\right)\left(1-\frac{e_2}{e}\right)\frac{k_4}{k_3}-\frac{\zeta}{d}=0$$

Similarly, the following equation (11b) is obtained by multiplying both members of the equation (10b) by $k_2 k_3$.

$$\frac{e_2}{e}\left(\frac{1}{e}+\frac{\zeta}{d}\right)\frac{k_2}{k_1}-\frac{1}{e}\left(1-\frac{e_2}{e}\right)\frac{k_3}{k_1}-\frac{e_2}{e^2}\cdot\frac{k_2}{k_4}+ \quad (11b)$$

$$\left(\frac{1}{e}-\frac{\zeta}{d}\right)\left(1-\frac{e_2}{e}\right)\frac{k_2}{k_4}+\frac{\zeta}{d}=0$$

By using $k_1/k_4 = n$, the equations (11a) and (11b) are rewritten, respectively, as the following equations (12a) and (12b).

$$\frac{e_2}{e}\left(\frac{1}{e}-\frac{\zeta}{d}\right)\frac{k_1}{k_2}+\frac{e_2}{e^2}\cdot\frac{k_1}{k_3}+\frac{1}{e}\left(1-\frac{e_2}{e}\right)\frac{1}{n}\cdot\frac{k_1}{k_2}+$$

$$\left(\frac{1}{e}+\frac{\zeta}{d}\right)\left(1-\frac{e_2}{e}\right)\frac{1}{n}\cdot\frac{k_1}{k_3}-\frac{\zeta}{d}=0$$

$$\therefore \left\{\frac{e_2}{e}-\frac{e_2}{d}\zeta+\left(1-\frac{e_2}{e}\right)\frac{1}{n}\right\}\frac{k_1}{k_2}+ \quad (12a)$$

$$\left\{\frac{e_2}{e}+\left(1+\frac{e}{d}\zeta\right)\left(1-\frac{e_2}{e}\right)\frac{1}{n}\right\}\frac{k_1}{k_3}-\frac{e}{d}\zeta=0$$

$$\frac{e_2}{e}\left(\frac{1}{e}+\frac{\zeta}{d}\right)\frac{k_2}{k_1}-\frac{1}{e}\left(1-\frac{e_2}{e}\right)\frac{k_3}{k_1}-\frac{e_2}{e^2}n\frac{k_2}{k_1}+$$

$$\left(\frac{1}{e}-\frac{\zeta}{d}\right)\left(1-\frac{e_2}{e}\right)n\frac{k_3}{k_1}+\frac{\zeta}{d}=0$$

$$\therefore \left\{\frac{e_2}{e}+\frac{e_2}{d}\zeta-\frac{e_2}{e}n\right\}\frac{k_2}{k_1}- \quad (12b)$$

$$\left\{1-\frac{e_2}{e}-\left(1-\frac{e}{d}\zeta\right)\left(1-\frac{e_2}{e}\right)n\right\}\frac{k_3}{k_1}+\frac{e}{d}\zeta=0$$

The equation (12b) is changed as follows:

$$\frac{k_1}{k_3} = \frac{\left\{1 - \frac{e_2}{e} - \left(1 - \frac{e}{d}\zeta\right)\left(1 - \frac{e_2}{e}\right)n\right\}\frac{k_1}{k_2}}{\left\{\frac{e_2}{e} + \frac{e_2}{d}\zeta - \frac{e_2}{e}n\right\} + \frac{e}{d}\zeta\frac{k_1}{k_2}} \quad (13)$$

Substitution of the equation (13) into the equation (12a) yields the following equation (14).

$$\left\{\frac{e_2}{e} - \frac{e_2}{d}\zeta + \left(1 - \frac{e_2}{e}\right)\frac{1}{n}\right\}\frac{e}{d}\zeta\left(\frac{k_1}{k_2}\right)^2 +$$

$$\left[\left\{\frac{e_2}{e} - \frac{e_2}{d}\zeta + \left(1 - \frac{e_2}{e}\right)\frac{1}{n}\right\}\left\{\frac{e_2}{e} + \frac{e_2}{d}\zeta - \frac{e_2}{e}n\right\} + \right.$$

$$\left\{\frac{e_2}{e} + \left(1 + \frac{e}{d}\zeta\right)\left(1 - \frac{e_2}{e}\right)\frac{1}{n}\right\}$$

$$\left.\left\{1 - \frac{e_2}{e} - \left(1 - \frac{e}{d}\zeta\right)\left(1 - \frac{e_2}{e}\right)n\right\} - \left(\frac{e}{d}\zeta\right)^2\right]\frac{k_1}{k_2} -$$

$$\left\{\frac{e_2}{e} + \frac{e_2}{d}\zeta - \frac{e_2}{e}n\right\}\frac{e}{d}\zeta = 0$$

$$\left\{\frac{e_2}{e}\left(1 - \frac{e}{d}\zeta\right) + \left(1 - \frac{e_2}{e}\right)\frac{1}{n}\right\}\frac{e}{d}\zeta\left(\frac{k_1}{k_2}\right)^2 +$$

$$\left[\left\{\frac{e_2}{e}\left(1 - \frac{e}{d}\zeta\right) + \left(1 - \frac{e_2}{e}\right)\frac{1}{n}\right\}\right.$$

$$\left\{\frac{e_2}{e}\left(1 + \frac{e}{d}\zeta\right) - \frac{e_2}{e}n\right\} +$$

$$\left\{\frac{e_2}{e} + \left(1 + \frac{e}{d}\zeta\right)\left(1 - \frac{e_2}{e}\right)\frac{1}{n}\right\}$$

$$\left.\left\{\left(1 - \frac{e_2}{e}\right)\left(1 - \left(1 - \frac{e}{d}\zeta\right)n\right)\right\} - \left(\frac{e}{d}\zeta\right)^2\right]\frac{k_1}{k_2} -$$

$$\frac{e_2}{e}\left(1 + \frac{e}{d}\zeta - n\right)\frac{e}{d}\zeta = 0$$

$$\left\{\frac{e_2}{e}\left(1 - \frac{e}{d}\zeta\right) + \left(1 - \frac{e_2}{e}\right)\frac{1}{n}\right\}\frac{e}{d}\zeta\left(\frac{k_1}{k_2}\right)^2 +$$

$$\left[-1 + 2\frac{e_2}{e} - 2\frac{e_2}{e}\left(\frac{e}{d}\zeta\right)^2 + \right.$$

$$\left.\left(1 + \frac{e}{d}\zeta\right)\left(1 - \frac{e_2}{e}\right)\frac{1}{n} - \frac{e_2}{e}\left(1 - \frac{e}{d}\zeta\right)n\right]\frac{k_1}{k_2} -$$

-continued $$\frac{e_2}{e}\left(1 + \frac{e}{d}\zeta - n\right)\frac{e}{d}\zeta = 0$$

$$\therefore \left[\left\{\frac{e_2}{e}\left(1 - \frac{e}{d}\zeta\right) + \left(1 - \frac{e_2}{e}\right)\frac{1}{n}\right\}\frac{k_1}{k_2} - \frac{e_2}{e}\cdot\frac{e}{d}\zeta\right] \quad (14)$$

$$\left[\frac{e}{d}\zeta\frac{k_1}{k_2} + 1 + \frac{e}{d}\zeta - n\right] = 0$$

By solving the equation (14), we can obtain the following equations (15a) and (15b).

$$\frac{k_1}{k_2} = \frac{\frac{e_2}{e}\cdot\frac{e}{d}\zeta}{\frac{e_2}{e}\left(1 - \frac{e}{d}\zeta\right) + \left(1 - \frac{e_2}{e}\right)\frac{1}{n}} \quad (15a)$$

$$\frac{k_1}{k_2} = \frac{-\left(1 + \frac{e}{d}\zeta - n\right)}{\frac{e}{d}\zeta} \quad (15b)$$

We obtain the following equation (16a) by selecting the equation (15a).

$$\frac{k_3}{k_1} = \frac{\frac{e_2/e}{1 - e_2/e} + \left(1 + \frac{e}{d}\zeta\right)\frac{1}{n}}{\frac{e}{d}\zeta} \quad (16a)$$

The following equation (16b) is obtained by selecting the equation (15b).

$$\frac{k_3}{k_1} = \frac{\frac{e}{d}\zeta}{1 - n + \frac{e}{d}\zeta n} \quad (16b)$$

Thus, the input axis 22 of the input drive shaft 2 is held horizontal when the support stiffnesses $k_1$-$k_4$ of the four support points $S_1$, $S_2$, $S_3$ and $S_4$ are so determined as to satisfy either of a first collection of simultaneous equations (17a), (17b) and (17c), and a second collection of simultaneous equations (18a), (18b) and (18c).

$$\frac{k_2}{k_1} = \frac{\frac{e_2}{e}\left(1 - \frac{e}{d}\zeta\right) + \left(1 - \frac{e_2}{e}\right)\frac{1}{n}}{\frac{e_2}{e}\cdot\frac{e}{d}\zeta} \quad (17a)$$

$$\frac{k_3}{k_1} = \frac{1}{\frac{e}{d}\zeta}\left\{\frac{\frac{e_2}{e}}{1 - \frac{e_2}{e}} + \left(1 + \frac{e}{d}\zeta\right)\frac{1}{n}\right\} \quad (17b)$$

$$\frac{k_4}{k_1} = \frac{1}{n} \quad (17c)$$

$$\frac{k_2}{k_1} = \frac{-\frac{e}{d}\zeta}{1 + \frac{e}{d}\zeta - n} \quad (18a)$$

-continued $$\frac{k_3}{k_1} = \frac{\frac{e}{d}\zeta}{1 + \frac{e}{d}\zeta n - n} \quad (18b)$$

$$\frac{k_4}{k_1} = \frac{1}{n} \quad (18c)$$

In this way, the support structure satisfying one of the first and second collections of equations exactly or approximately is able to prevent inclination of the input axis 22 of the input drive shaft 2.

A condition for the equations (17a), (17b) and (17c) is;

$$n < \frac{1 - \frac{e_2}{e}}{\frac{e_2}{e}\left(\frac{e}{d}\zeta - 1\right)}$$

A condition for the equations (18a), (18b) and (18c) is:

When $1 - \frac{e}{d}\zeta > 0, 1 + \frac{e}{d}\zeta < n < \frac{1}{1 - \frac{e}{d}\zeta}$ When $1 - \frac{e}{d}\zeta < 0, n > 1 + \frac{e}{d}\zeta$ When, for example, the condition expressed as:

$$\frac{e_2}{e} = \frac{2}{5}, \frac{e}{d}\zeta = 1$$

is employed, then we can obtain the following numerical examples.

$$n = 1 \quad \frac{k_2}{k_1} = \frac{3}{2} \quad \frac{k_3}{k_1} = \frac{8}{3} \quad \frac{k_4}{k_1} = 1 \quad (i)$$

$$n = \frac{3}{2} \quad \frac{k_2}{k_1} = 1 \quad \frac{k_3}{k_1} = 2 \quad \frac{k_4}{k_1} = \frac{2}{3} \quad (ii)$$

$$n = 2 \quad \frac{k_2}{k_1} = \frac{3}{4} \quad \frac{k_3}{k_1} = \frac{5}{3} \quad \frac{k_4}{k_1} = \frac{1}{2} \quad (iii)$$

$$n = 4 \quad \frac{k_2}{k_1} = \frac{3}{8} \quad \frac{k_3}{k_1} = \frac{7}{6} \quad \frac{k_4}{k_1} = \frac{1}{4} \quad (iv)$$

$$n = 6 \quad \frac{k_2}{k_1} = \frac{1}{4} \quad \frac{k_3}{k_1} = 1 \quad \frac{k_4}{k_1} = \frac{1}{6} \quad (v)$$

$$n = 8 \quad \frac{k_2}{k_1} = \frac{3}{16} \quad \frac{k_3}{k_1} = \frac{11}{12} \quad \frac{k_4}{k_1} = \frac{1}{8} \quad (vi)$$

As known from the above examples, at least one of the first and third support stiffnesses $k_1$ and $k_3$ is the greatest. The first and third stiffnesses $k_1$ and $k_3$ may be equal to each other, as in the example (v). The first support stiffness $k_1$ may be equal to equal to the second or fourth support stiffness $k_2$ or $k_4$, as in the example (i) or (ii).

When the specific condition;

$$\frac{e_2}{e} = \frac{1}{2} \quad \frac{e}{d}\zeta = 1$$

is employed, then;

$$\frac{k_2}{k_1} = \frac{1}{n} \quad \frac{k_3}{k_1} = 1 + \frac{2}{n} \quad \frac{k_4}{k_1} = \frac{1}{n}$$

In this case, the second and fourth support stiffnesses $k_2$ and $k_4$ are equal to each other. With a further limitation that $n=1$, we obtain;

$$k_1 = k_2 = k_4 \quad k_3 = 3k_1$$

Figure 1:
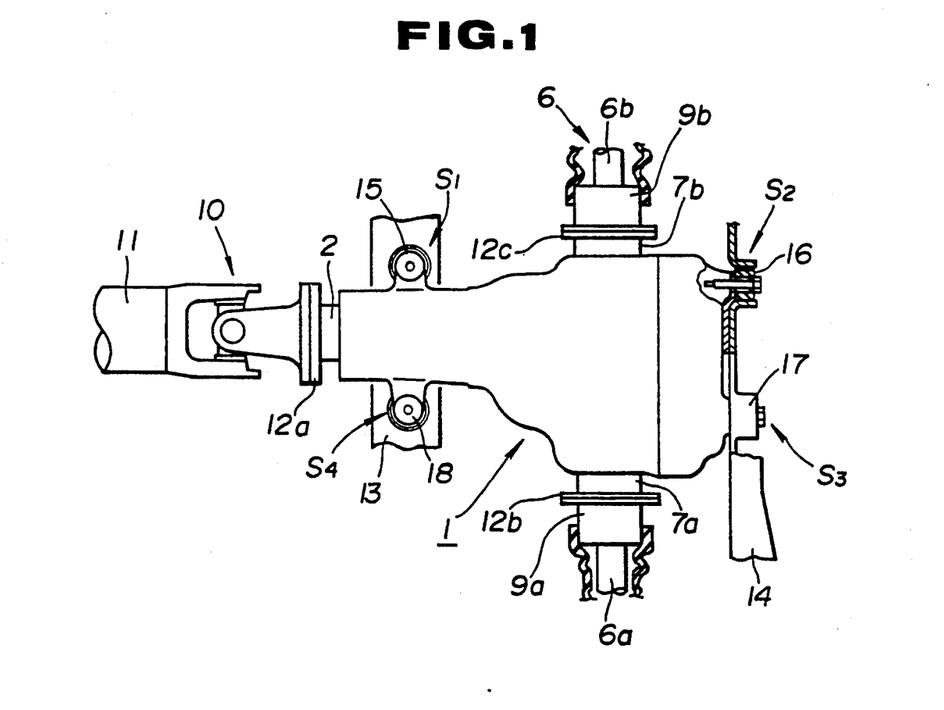
FIG. 1 is a partially cutaway plan view showing a final drive support structure of a first embodiment according to the present invention.
Figure 2:
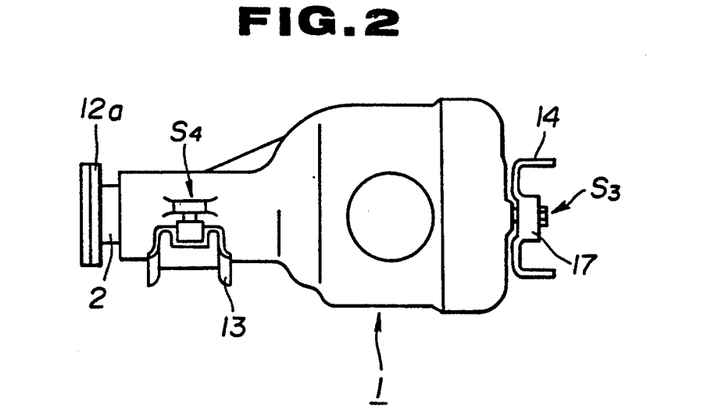
FIG. 2 is a side elevation of the final drive support structure shown in FIG. 1.
Figure 3:
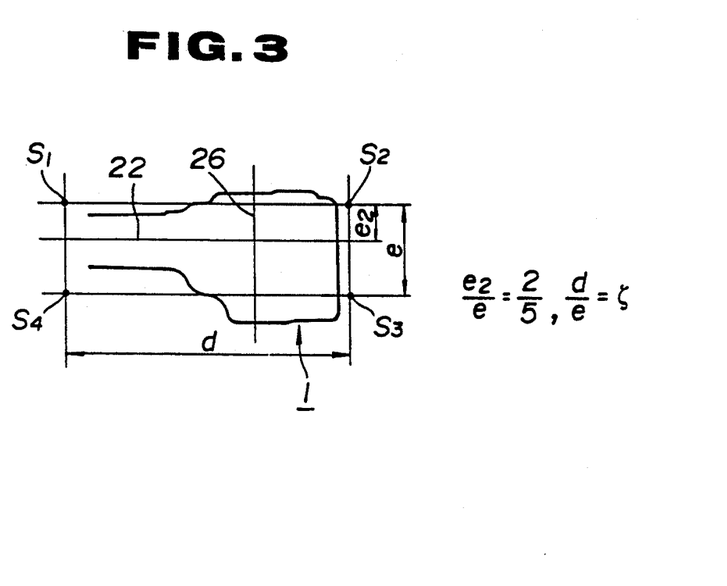
FIG. 3 is a schematic plan view for illustrating four support points of the final drive support structure shown in FIG. 1.

FIGS. 1-3 show a final drive support structure according to a first embodiment of the present invention. The final drive support structure includes a final drive assembly 1 which is constructed as shown in FIG. 5. The final drive assembly 1 of this embodiment has an input drive shaft 2, left and right output shafts 7a and 7b, a final reduction gear pair consisting of a drive pinion (or final reduction smaller gear) 3 and a ring gear (or final reduction larger gear) 5, and a differential 4. The differential 4 may be a limited slip differential. The front end (that is, the left end, as viewed in FIG. 1) of the input drive shaft 2 has a connection flange 12a. The front end of the input drive shaft 2 is connected with a propeller shaft (or drive shaft) 11 of the vehicle, by a universal joint 10 such as a Cardan joint. Therefore, a driving torque produced by an engine of the vehicle is transmitted through the propeller shaft 11, the joint 10 and the connection flange 12a, to the input drive shaft 2 of the final drive assembly 1.

The differential 4 is connected between the left and right output shafts 7a and 7b, and the final reduction gear pair is connected between the input drive shaft 2 and the differential 4. The differential 4 comprises a differential case, pinion mate gears and left and right side gears (which are not shown because they are well-known). The left output shaft 7a is integral, or drivingly connected, with the left side gear of the differential 4, and the right output shaft 7b is integral, or drivingly connected, with the right side gear. Each output shaft 7a or 7b extends substantially in parallel to the lateral axis of the vehicle, from an inboard end to an outboard end which is formed with a connection flange 12b or 12c. The left and right output shafts 7a and 7b are connected, respectively, with left and right axle shafts 6a and 6b of left and right drive wheels of the vehicle. In this embodiment, the drive wheels are rear wheels of the vehicle. There are further provided inboard joints 9a and 9b, and outboard joints (not shown), such as constant velocity universal joints, respectively, at inboard and outboard ends of each axle shaft 6a or 6b.

The input drive shaft 2 extends substantially in parallel to the longitudinal axis of the vehicle, from the front end formed with the outward flange 12a, to a rear end at which the drive pinion 3 is located. The drive pinion 3 is coaxial with the input drive shaft 2, and integral, or drivingly connected, with the input drive shaft 2. A common axis of the input drive shaft 2 and the drive pinion 3 is an input axis 22 of the final drive assembly 1. The input axis 22 is substantially parallel to the longitudinal axis of the vehicle.

The ring gear 5 is rotatable about an output axis 26 of the final drive assembly 1. The output shafts 7a and 7b, and the side gears of the differential 4 are coaxial with the ring gear 5. The output axis 26 is substantially parallel to the lateral axis of the vehicle. The final drive assembly 1 is suspended at the first, second, third and fourth support points $S_1$, $S_2$, $S_3$ and $S_4$, on vehicle body members 13 and 14 which are components of the vehicle body.

The final drive support structure further includes first, second, third and fourth elastic supporting means disposed, respectively, at the first, second, third and fourth support points $S_1$, $S_2$, $S_3$ and $S_4$. Each elastic supporting means comprises an elastic member interposed between the final drive assembly 1 and the vehicle body. The elastic member of each supporting means is made of rubber or other material having elastic properties. In this embodiment, the first elastic supporting means at the first support point $S_4$ comprises an elastic bushing 15 and a pin. The final assembly 1 is connected through the elastic bushing 15 to the vehicle body member 13 at the first support point $S_1$. Each of the second and third elastic supporting means comprises an elastic bushing 16 or 17, and a pin, and connects the final assembly 1 to the vehicle body member 17 through the elastic bushing 16 or 17. The fourth elastic supporting means comprises an elastic bushing 18 and a pin, and connects the final assembly 1 to the vehicle body member 13 through the elastic bushing 18.

FIG. 3 schematically shows the support structure shown in FIG. 1. The final drive assembly 1 has the input axis 22 and the output axis 26, as shown in FIG. 3. The first and fourth support points $S_1$ and $S_4$ are located on the front side of the output axis 26, and the second and third support points $S_2$ and $S_3$ are on the rear side of the output axis 26. The first and second support points $S_1$ and $S_2$ are located on the right side of the input axis 22, and the third and fourth support points $S_3$ and $S_4$ are on the left side of the input axis 22. In this embodiment, the ring gear (or final reduction larger gear) 5 is disposed on the left side of the input axis 22. Therefore, the third and fourth support points $S_3$ and $S_4$ are on the same side (first lateral side) as the ring gear 5 while the first and second support points $S_1$ and $S_2$ are on the opposite side (second lateral side). In this embodiment, each of a first longitudinal straight line passing through the first and second points $S_1$ and $S_2$, and a second longitudinal straight line passing through the fourth and third points $S_4$ and $S_3$ is substantially parallel to the longitudinally extending input axis 22 of the final assembly 1. Each of a first lateral straight line passing through the first and fourth points $S_1$ and $S_4$, and a second lateral straight line passing through the second and third points $S_2$ and $S_3$ is substantially parallel to the laterally extending output axis 26 of the final drive assembly 1. Therefore, the four support points $S_1$, $S_2$, $S_3$ and $S_4$ form a rectangle.

In this embodiment, a total lateral distance e, a partial lateral distance $e_2$, a total longitudinal distance d and a final reduction gear ratio $\zeta$ are so determined as to satisfy the following relationship.

$$e_2/e = 2/5 \, d/e = \zeta$$

As shown in FIG. 3, the total lateral distance e is a distance between the first and fourth points $S_1$ and $S_4$, the partial lateral distance $e_2$ is a distance between the input axis 22 and the first longitudinal straight line connecting the first and second points $S_1$ and $S_2$, and the total longitudinal distance d is a distance between the first and second points $S_1$ and $S_2$. The total longitudinal distance d is greater than the total lateral distance e, as shown in FIG. 3.

The support stiffnesses $k_1$, $k_2$, $k_3$ and $k_4$ at $S_1$, $S_2$, $S_3$ and $S_4$ are so determined as to satisfy the first collection of the equations (17a), (17b) and (17c), or the second collection of the equations (18a), (18b) and (18c). For example, one of the numerical examples (i)-(vi) is employed.

It is possible to adjust the support stiffness of each support point in various ways. For example, the support stiffness of each support point can be varied by changing one or more of the various conditions of the rubber bushing 15, 16, 17 or 18, such as shape, size, carbon content and vulcanization condition of the rubber.

The thus constructed final drive support of the first embodiment can hold the input axis 22 horizontal, or parallel to the longitudinal axis of the vehicle body, by causing a rolling displacement of the final drive assembly 1 due to the drive shaft torque M (shown in FIG. 5) around the input axis, and a pitching displacement due to the staring torque $\zeta M$ around the output axis 26, to cancel each other on the input axis 22 of the drive shaft 2 (as shown in FIG. 8). Therefore, even when the starting torque in a rapid start of the vehicle displaces the final drive assembly 1, the input drive shaft 2 is held horizontal, and the change in the angle of the Cardan joint 10 is held very small. In this way, the final drive support structure of the first embodiment can reduce vibrations and noise, and improve the durability of the drive line including the propeller shaft 11, the joint 10, and the final drive assembly 1. In each of the examples (1), (ii) and (v), two of the four support stiffnesses $k_1$-$k_4$ are equal to each other. Therefore, it is possible to reduce the manufacturing cost by reducing the number of required component parts of different kinds.

Figure 4:
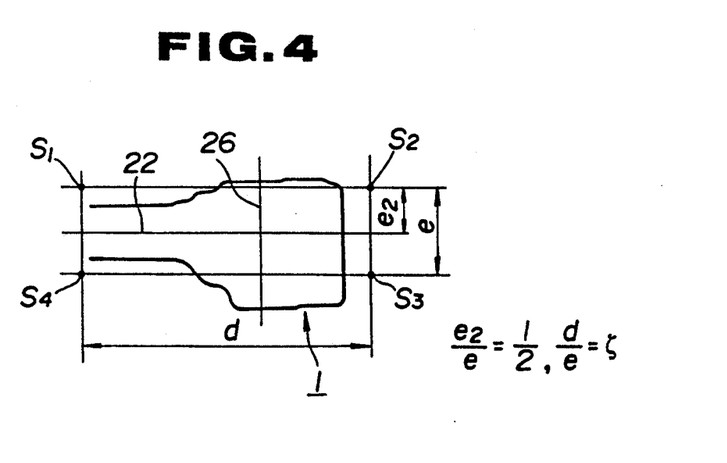
FIG. 4 is a schematic plan view for illustrating the four support points of a final drive support structure of a second embodiment according to the present invention.

FIG. 4 shows a second embodiment of the present invention. In the second embodiment, the partial lateral distance $e_2$ is equal to a half of the total lateral distance e, and the final reduction ratio $\zeta$ is set equal to a quotient obtained by dividing d by e. That is;

$$e_2/e = \tfrac{1}{2} d/e = \zeta$$

Thus, the first and fourth support points $S_1$ and $S_4$ are equally distant from the input axis 22, and the second and third support points $S_2$ and $S_3$ are equally distant from the input axis 22.

Furthermore, the support stiffnesses $k_1$-$k_4$ are determined so as to satisfy the following relationship.

$$k_1 = k_2 = k_4 \quad k_3 = 3k_1$$

That is, the first, second and fourth support stiffnesses $k_1$, $k_2$ and $k_4$ are all equal to a predetermined lower value, and the third support stiffness $k_3$ is thrice as large as the lower value. The second embodiment can further reduce the manufacturing cost since the same elastic member can be used in common for three support points.

What is claimed is:

1. A final drive supporting structure for a vehicle, comprising:
   a final drive assembly comprising a final reduction gear set comprising a drive pinion rotatable about a predetermined input axis, and a ring gear which is in engagement with said drive pinion and which is rotatable about a predetermined output axis lying in an imaginary lateral plane substantially perpendicular to said input axis, said ring gear being disposed on a first lateral side of an imaginary longitudinal plane which contains said input axis and which is substantially perpendicular to said output axis; and first, second, third and fourth supporting means for elastically supporting said final drive assembly to a vehicle body of the vehicle, respectively, at first, second, third and fourth support points, said first and fourth supporting means being located on a front side of said lateral plane, and said second and third supporting means being located on a rear side of said lateral plane which is opposite to said front side, said first and second supporting means being located on a second lateral side of said longitudinal plane which is opposite to said first lateral side, and said third and fourth supporting means being located on said first lateral side of said longitudinal plane, said first, second, third and fourth supporting means having respective stiffnesses each of which is equal to or smaller than a predetermined maximum value, the stiffness of at least one of said first, second, third and fourth supporting means being smaller than said maximum value, the stiffness of one of said first and third supporting means being equal to said maximum value.

2. A final drive supporting structure according to claim 1 wherein said drive pinion is disposed on said front side of said lateral plane, and said final drive assembly is adapted to be mounted on the vehicle so that said input axis extends along a longitudinal axis of the vehicle, and said output axis extends along a lateral axis of the vehicle.

3. A final drive supporting structure according to claim 2 wherein said first, second, third and fourth supporting means are arranged so that each of a first longitudinal straight line connecting said first and second support points and a second longitudinal straight line connecting said fourth and third support points extends substantially in parallel to said longitudinal plane, and each of a first lateral straight line connecting said first and fourth support points and a second lateral straight line connecting said second and third support points extends substantially in parallel to said lateral plane.

4. A final drive supporting structure according to claim 3 wherein the stiffnesses of said first, second, third and fourth supporting means are determined so as to satisfy one of a first collection of equations and a second collection of equations, the equations of said first collection being expressed as;

$$\frac{k_2}{k_1} = \frac{\frac{e_2}{e}\left(1 - \frac{e}{d}\zeta\right) + \left(1 - \frac{e_2}{e}\right)\frac{1}{n}}{\frac{e_2}{e} \cdot \frac{e}{d}\zeta}$$

$$\frac{k_3}{k_1} = \frac{1}{\frac{e}{d}\zeta}\left\{\frac{\frac{e_2}{e}}{1 - \frac{e_2}{e}} + \left(1 + \frac{e}{d}\zeta\right)\frac{1}{n}\right\}$$

$$\frac{k_4}{k_1} = \frac{1}{n}$$

the equations of said second collection being expressed as;

$$\frac{k_2}{k_1} = \frac{-\frac{e}{d}\zeta}{1 + \frac{e}{d}\zeta - n}$$

$$\frac{k_3}{k_1} = \frac{\frac{e}{d}\zeta}{1 + \frac{e}{d}\zeta n - n}$$

$$\frac{k_4}{k_1} = \frac{1}{n}$$

where $k_1$, $k_2$, $k_3$ and $k_4$ are, respectively, the stiffnesses of said first, second, third and fourth supporting means, $\zeta$ is a final gear reduction ratio of said final drive assembly, e is a total lateral distance between said first and second longitudinal straight lines, $e_2$ is a partial lateral distance between said first longitudinal straight line and said input axis, and d is a total longitudinal distance between said first and second lateral straight lines.

5. A final drive supporting structure according to claim 4 wherein the stiffness of said third supporting means is equal to said maximum value, each of the stiffnesses of said first, second and fourth supporting means is substantially equal to one third of said maximum value, said partial lateral distance between said first longitudinal straight line and said input axis is substantially equal to a half of said total lateral distance between said first and second longitudinal straight lines, and said final reduction ratio is substantially equal to a quotient obtained by dividing said total longitudinal distance between said first and second lateral straight lines by said total lateral distance between said first and second longitudinal straight lines.

6. A final drive supporting structure according to claim 4 wherein said final drive assembly further comprises an input drive shaft coaxial with said drive pinion, left and right output shafts, and a differential connected between said left and right output shafts, said reduction gear set being connected between said input drive shaft and said differential so that a torque is transmitted from said input drive shaft to said differential through said reduction gear set.

7. A final drive supporting structure according to claim 6 wherein said first lateral side is a left side of said longitudinal plane, and said second lateral side is a right side of said longitudinal plane, said ring gear and said fourth and third supporting means being disposed on said left side and said first and second supporting means being disposed on said right side.

8. A final drive supporting structure according to claim 4 wherein each of said first, second, third and fourth supporting means comprises an elastic member which is to be interposed between said final drive assembly and the vehicle body and which determines the stiffness of said supporting means.

9. A final drive supporting structure according to claim 4 wherein said partial lateral distance is smaller than a half of said total lateral distance, and said final reduction ratio is substantially equal to a quotient obtained by dividing said total longitudinal distance by said total lateral distance which is smaller than said total longitudinal distance.

10. A final drive supporting structure according to claim 9 wherein said partial lateral distance is substantially equal to two fifths of said total lateral distance.

11. A vehicle comprising:

a vehicle body;
a drive wheel;
a propeller shaft;
a final drive assembly comprising an input rotary member connected with said propeller shaft, an output rotary member connected with an axle of said drive wheel, and a final reduction gear set through which rotation is transmitted from said input member to said output member, an axis of said input member extending along a longitudinal axis of said vehicle, and an axis of said axle extending along a lateral axis of said vehicle, said final reduction gear set comprising larger and smaller gears engaging with each other; and first, second, third and fourth supporting means for elastically suspending said final drive assembly on said vehicle body, respectively, at first, second, third and fourth support points, said first and fourth support points being located forward of the axis of said axle, and said second and third support points being located rearward of the axis of said axle, said fourth and third support points being located on a first lateral side of the axis of said input member on which said larger gear of said final reduction gear set is disposed, and said first and second support points being located on a second lateral side of the axis of said input member, said first, second, third and fourth supporting means having respective stiffnesses each of which is equal to or smaller than a predetermined maximum value, the stiffness of at least one of said first, second, third and fourth supporting means being smaller than said maximum value, the stiffness of one of said first supporting means at said first support point and said third supporting means at said third support point being equal to said maximum value.

12. A vehicle according to claim 11 wherein said first, second, third and fourth supporting means are arranged so that each of a first longitudinal straight line connecting said first and second support points and a second longitudinal straight line connecting said fourth and third support points extends substantially in parallel to the axis of said input member, and each of a first lateral straight line connecting said first and fourth support points and a second lateral straight line connecting said second and third support points extends substantially in parallel to the axis of said axle, and wherein the stiffnesses of said first, second, third and fourth supporting means are determined so as to satisfy one of a first collection of equations and a second collection of equations, the equations of said first collection being expressed as;

$$\frac{k_2}{k_1} = \frac{\frac{e_2}{e}\left(1 - \frac{e}{d}\zeta\right) + \left(1 - \frac{e_2}{e}\right)\frac{1}{n}}{\frac{e_2}{e} \cdot \frac{e}{d}\zeta}$$

$$\frac{k_3}{k_1} = \frac{1}{\frac{e}{d}\zeta}\left\{\frac{\frac{e_2}{e}}{1 - \frac{e_2}{e}} + \left(1 + \frac{e}{d}\zeta\right)\frac{1}{n}\right\}$$

$$\frac{k_4}{k_1} = \frac{1}{n}$$

the equations of said second collection being expressed as;

$$\frac{k_2}{k_1} = \frac{-\frac{e}{d}\zeta}{1 + \frac{e}{d}\zeta - n}$$

$$\frac{k_3}{k_1} = \frac{\frac{e}{d}\zeta}{1 + \frac{e}{d}\zeta n - n}$$

$$\frac{k_4}{k_1} = \frac{1}{n}$$

where $k_1$, $k_2$, $k_3$ and $k_4$ are, respectively, the stiffnesses of said first, second, third and fourth supporting means, $\zeta$ is a final gear reduction ratio of said final drive assembly, e is a total lateral distance between said first and second longitudinal straight lines, $e_2$ is a partial lateral distance between said first longitudinal straight line and said input axis, and d is a total longitudinal distance between said first and second lateral straight lines.

13. A vehicle according to claim 11 wherein said first, second, third and fourth supporting means are arranged so that each of a first longitudinal straight line connecting said first and second support points and a second longitudinal straight line connecting said fourth and third support points extends substantially in parallel to the axis of said input member, and each of a first lateral straight line connecting said first and fourth support points and a second lateral straight line connecting said second and third support points extends substantially in parallel to the axis of said axle, and wherein the stiffness of said third supporting means is equal to said maximum value, each of the stiffnesses of said first, second and fourth supporting means is substantially equal to one third of said maximum value, a partial lateral distance between said first longitudinal straight line and the axis of said input member is substantially equal to a half of a total lateral distance between said first and second longitudinal straight lines, and a final gear reduction ratio of said final drive assembly is substantially equal to a quotient obtained by dividing said total longitudinal distance by said total lateral distance.

* * * * *